United States Patent
Shook et al.

(10) Patent No.: US 6,266,990 B1
(45) Date of Patent: Jul. 31, 2001

(54) METHOD FOR INTEGRALLY MANUFACTURING AN ONE-PIECE FORGED HOLLOW CRANK OF A BICYCLE

(76) Inventors: William Blair Shook, 3917 E. Eden Roc Cir., Tampa, FL (US) 33634; Sheng-Chang Chang, No. 5, Alley 28, Lane 462, Yuan Shui Road Section 2, Yuan Lin Chen, Chang Hua Hsien (TW)

( * ) Notice: Subject to any disclaimer, the term of this patent is extended or adjusted under 35 U.S.C. 154(b) by 0 days.

(21) Appl. No.: 09/656,276

(22) Filed: Sep. 6, 2000

(51) Int. Cl.[7] ................................................. B21C 23/00
(52) U.S. Cl. .............................. 72/256; 72/267; 72/377; 29/897.2; 29/557
(58) Field of Search ............................ 72/256, 267, 334, 72/352, 358, 377; 29/897.2, 557, 558; 74/594.1, 594.2

(56) References Cited

U.S. PATENT DOCUMENTS

| | | | |
|---|---|---|---|
| 3,940,969 | * 3/1976 | Princehouse | 72/354 |
| 5,197,353 | * 3/1993 | Trenerry et al. | 74/594.1 |
| 5,377,518 | * 1/1995 | Abbott | 72/267 |
| 6,085,405 | * 7/2000 | Kao | 72/267 |
| 6,195,894 | * 3/2001 | Mizobe et al. | 29/897.2 |

* cited by examiner

Primary Examiner—Ed Tolan
(74) Attorney, Agent, or Firm—Charles E. Baxley

(57) ABSTRACT

A method for integrally forming and manufacturing an one-piece forged hollow crank of a bicycle includes the following steps: (a) forging and molding a leading edge of a crank; (b) extruding a crank body; (c) forging and possibly sealing a rear end of the crank body; and (d) cutting and piercing the rear end of the crank body so as to form a hollow crank of a bicycle. In such a manner, the hollow crank can be integrally forged and molded quickly by fewer manufacturing steps than that of the conventional method. In addition, the product surface of the hollow crank is finished to have a fine and pretty appearance so that it is not easy to produce a defective product, thereby enhancing the aesthetics and quality and saving the manufacturing cost of hollow crank. Further, better aluminum alloys can be used with this method than can be used with the prior art casting or welding methods.

3 Claims, 7 Drawing Sheets

METHOD FOR INTEGRALLY MANUFACTURING AN ONE-PIECE FORGED HOLLOW CRANK OF A BICYCLE

BACKGROUND OF THE INVENTION

1. Field of the Invention

The present invention relates to a method for integrally forming and manufacturing an one-piece forged hollow crank of a bicycle.

2. Description of the Related Art

A hollow crank of a bicycle made by a first conventional method includes multiple forged pieces which are assembled by a welding process. However, the hollow crank forged by multiple pieces is not integrally molded, thereby creating a weld effected zone in the material, so that the hollow crank has a worse stress tolerance. Therefore, the conventional hollow crank must use only alloys that are weldable and must design around the problems of the welding.

A second conventional method for making a hollow crank of a bicycle in accordance with the prior art shown in FIGS. 1 and 2 comprises the following steps:

(a) melting a material;
(b) casting step;
(c) opening mold;
(d) removing sand core from a mold;
(e) clearing residue material;
(f) material surface treatment; and
(g) forming a screw hole in the rear end of a crank.

However, such a conventional method has complex steps, thereby greatly consuming time for making the hollow crank. In addition, by such a method, it is easy to produce a defective product which cannot be controlled by the steps. A major disadvantage to this method is the relatively lower strength of casting alloys to forging alloys.

In the casting process, it is necessary to make a blank 10 before machining the two ends of the hollow crank. The blank 10 is cast by the mold 11 in conjunction with the sand core 12. After the mold is opened, the maker has to remove the cast duct 13 and the cast nozzle 14 by a cutter, and treating the originally rough surface (air vents, sand and mold lines) by a grinding machine so as to work the two ends of the blank 10. Therefore, such a method greatly increases the cost of fabrication, and consumes a great deal of time.

SUMMARY OF THE INVENTION

The present invention has arisen to mitigate and/or obviate the disadvantage of the conventional method for manufacturing a hollow crank of a bicycle.

In accordance with one aspect of the present invention, there is provided a method for integrally forming and manufacturing an one-piece forged hollow crank of a bicycle comprising the steps of: (a) forging and molding a leading edge of a crank: forging and molding a stock of a hollow crank of a bicycle in a die by a forging machine to form a leading edge of a crank having a front end formed with a joint portion and a rear end formed with a preparing material; (b) extruding a crank body: moving a plunger into the preparing material to press and extrude the preparing material upward on the plunger to form an elongated hollow crank body on the plunger with a channel being formed in the hollow crank body; (c) forging and sealing a rear end of the crank body: after the plunger is removed from the hollow crank body, pressing the preparing material by a forging mold so that a material of a rear end of the preparing material is distorted and bent from all sides toward the channel to be embedded into the channel with a residue material being left on a rear end of the hollow crank body, and the material embedded into the channel alternating in an irregular shaped manner under the pressure exerted by the forging mold to seal a rear end of the channel of the hollow crank; and (d) cutting and piercing the rear end of the crank body: cutting the residue material left on the rear end of the hollow crank body by a cutting machine, and piercing a through hole in the hollow crank body by a pre-fitted machine so as to form a hollow crank.

In the step (b), the plunger is pressed into a central portion of the preparing material.

In the step (c), an irregular weldment is formed in the material embedded into the channel.

In such a manner, the hollow crank can be integrally forged and molded quickly by fewer manufacturing steps and out of better alloys than that of the conventional method. In addition, the product surface of the hollow crank is finished to have a fine and pretty appearance so that it is not easy to produce a defective product, thereby enhancing the aesthetics and quality and saving the manufacturing cost of hollow crank. Further, the method of the present invention can also save time of fabrication due to fewer manufacturing steps.

Further benefits and advantages of the present invention will become apparent after a careful reading of the detailed description with appropriate reference to the accompanying drawings.

DETAILED DESCRIPTION OF THE INVENTION

Figure 1:
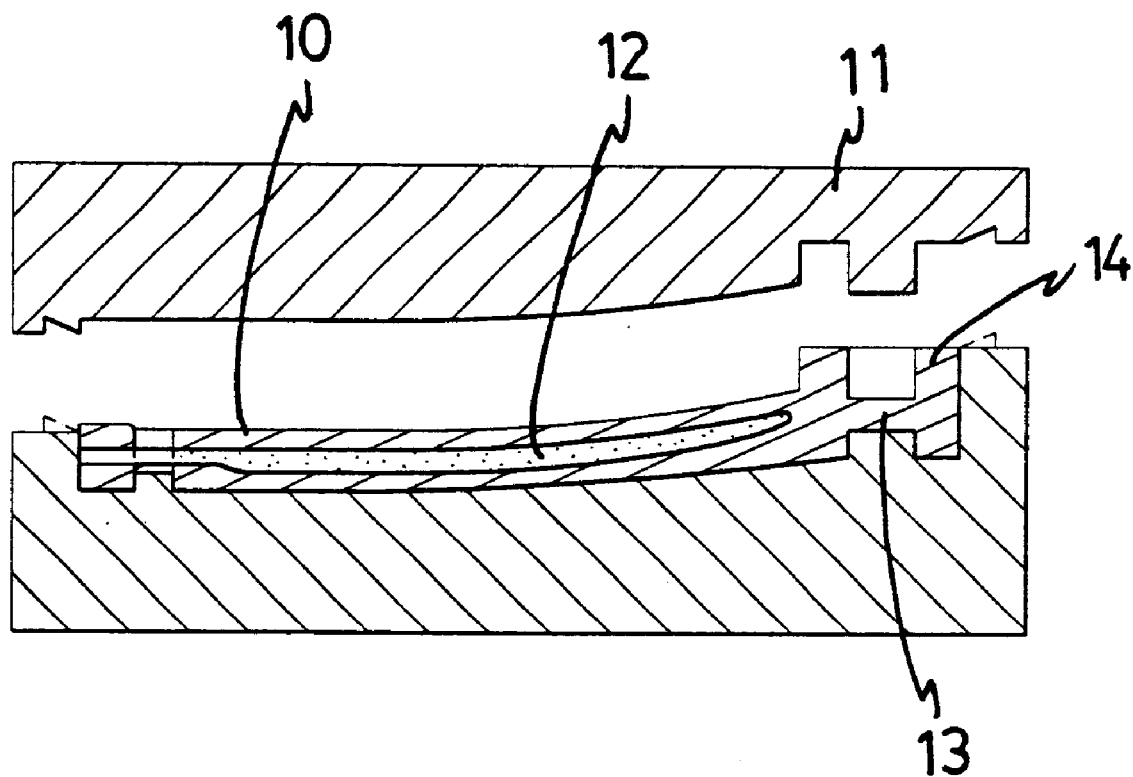
FIG. 1 is a front plan cross-sectional view of mold for a conventional method for making a hollow crank of a bicycle in accordance with the prior art.
Figure 2:
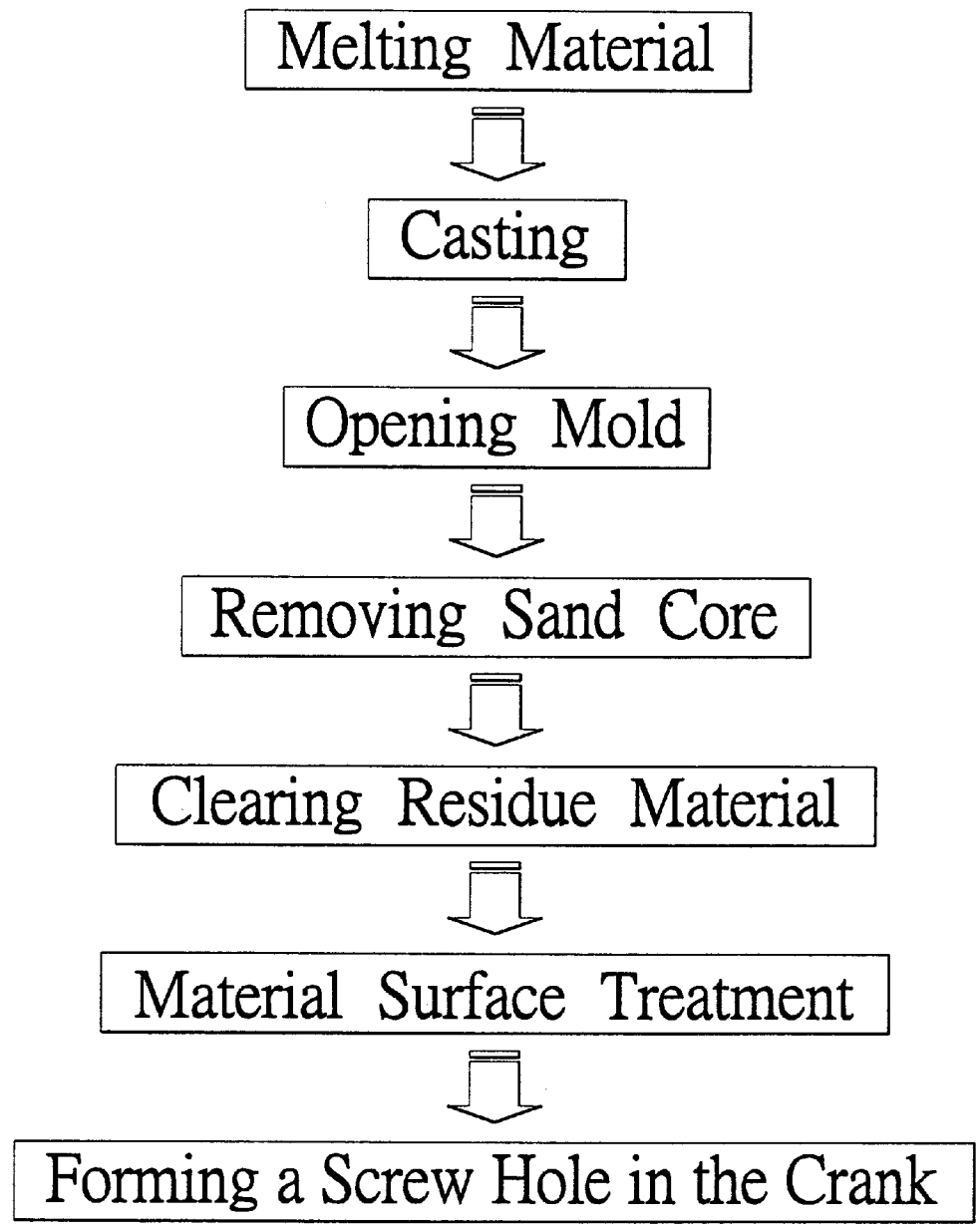
FIG. 2 is a flow chart of the conventional method.
Figure 3:
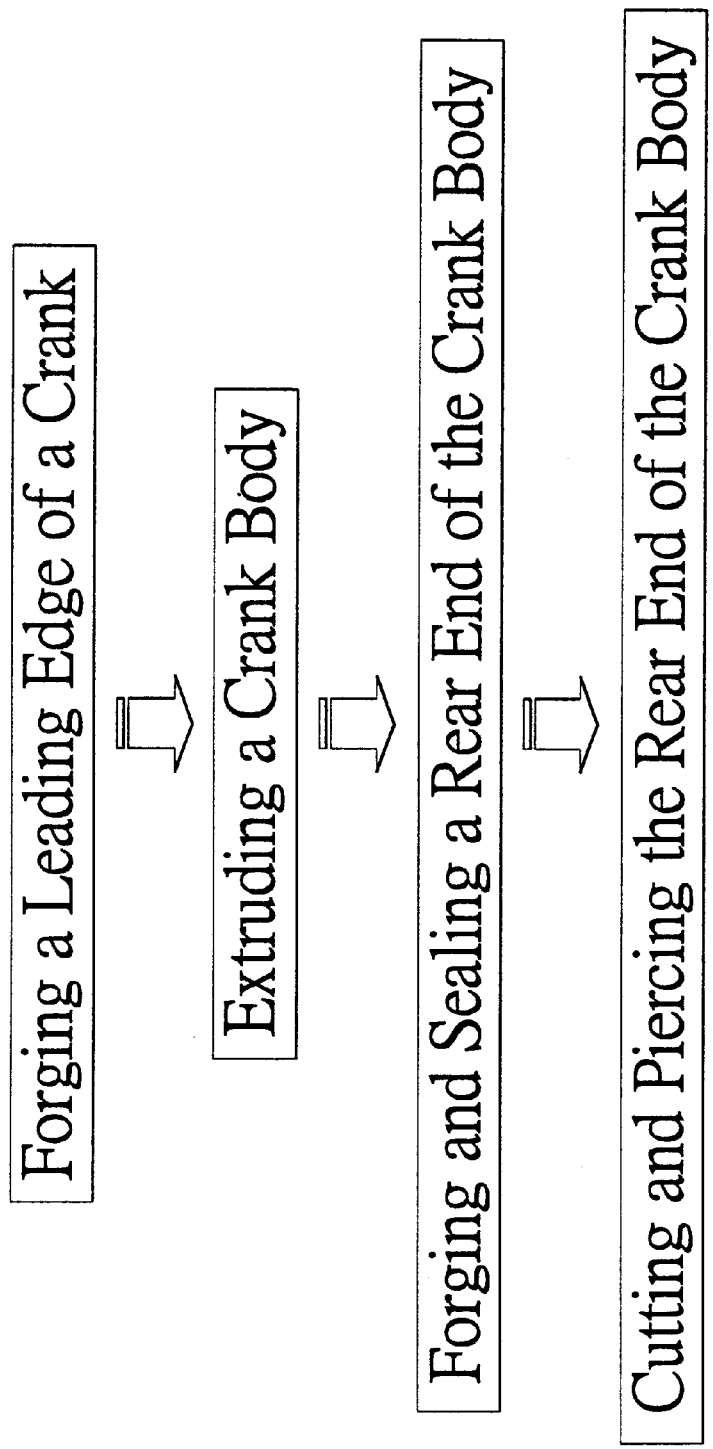
FIG. 3 is a flow chart of a method for integrally manufacturing an one-piece forged hollow crank of a bicycle in accordance with the present invention.

Referring to the drawings and initially to FIG. 3, a method for integrally forming and manufacturing an one-piece forged hollow crank of a bicycle in accordance with the present invention comprises the following steps: (a) forging and molding a leading edge of a crank; (b) extruding a crank body; (c) forging and sealing a rear end of the crank body; and (d) cutting and piercing the rear end of the crank body.

Figure 4:
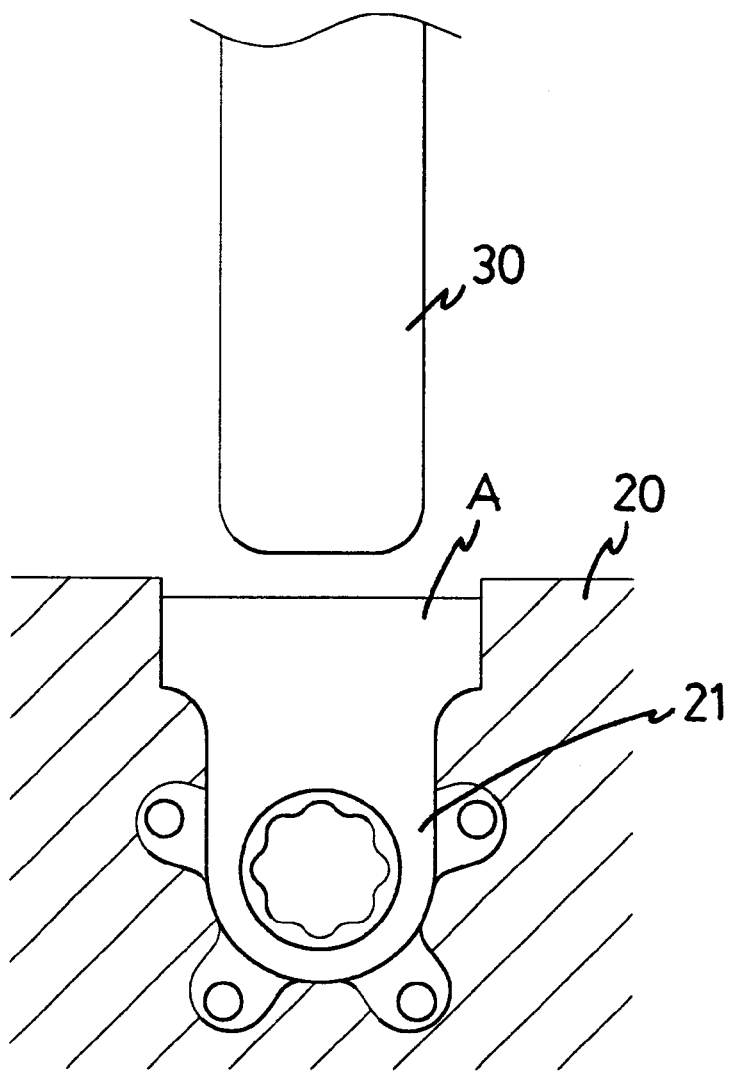
FIG. 4 is a front plan cross-sectional view showing a first step of the method as shown in FIG. 3.

Referring to FIG. 4, in the step (a) for forging and molding a leading edge of a crank, a stock of a hollow crank of a bicycle in a die 20 is forged and molded by a forging machine to form a leading edge of a crank having a front end formed with a joint portion 21 and a rear end formed with a preparing material "A".

Figure 5:
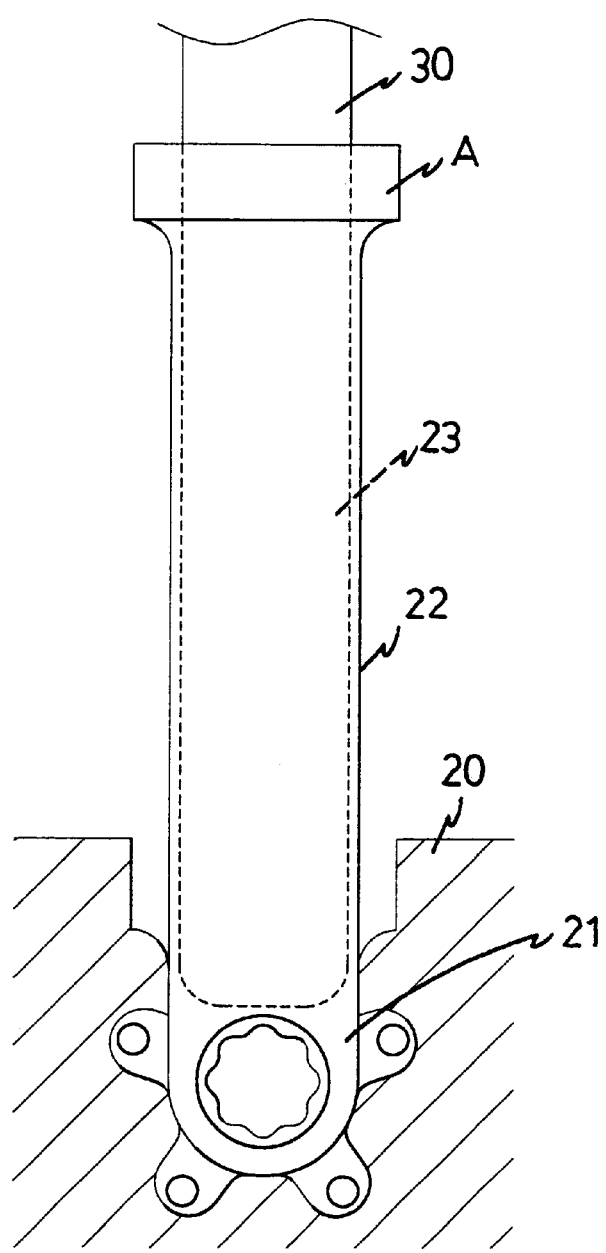
FIG. 5 is a front plan cross-sectional view showing a second step of the method as shown in FIG. 3.

Referring to FIGS. 4 and 5, in the step (b) for extruding a crank body, a plunger 30 is moved into a central portion of the preparing material A to press, distort and extrude the preparing material "A" upward on the plunger 30 so that a central material with the maximum material properties is extruded to form an elongated hollow crank body 22 on the plunger 30 with an elongated channel 23 being formed in the central portion of the hollow crank body 22. The hollow crank body 22 has a front end formed with the joint portion 21 and a rear end formed with the preparing material "A".

Figure 6:
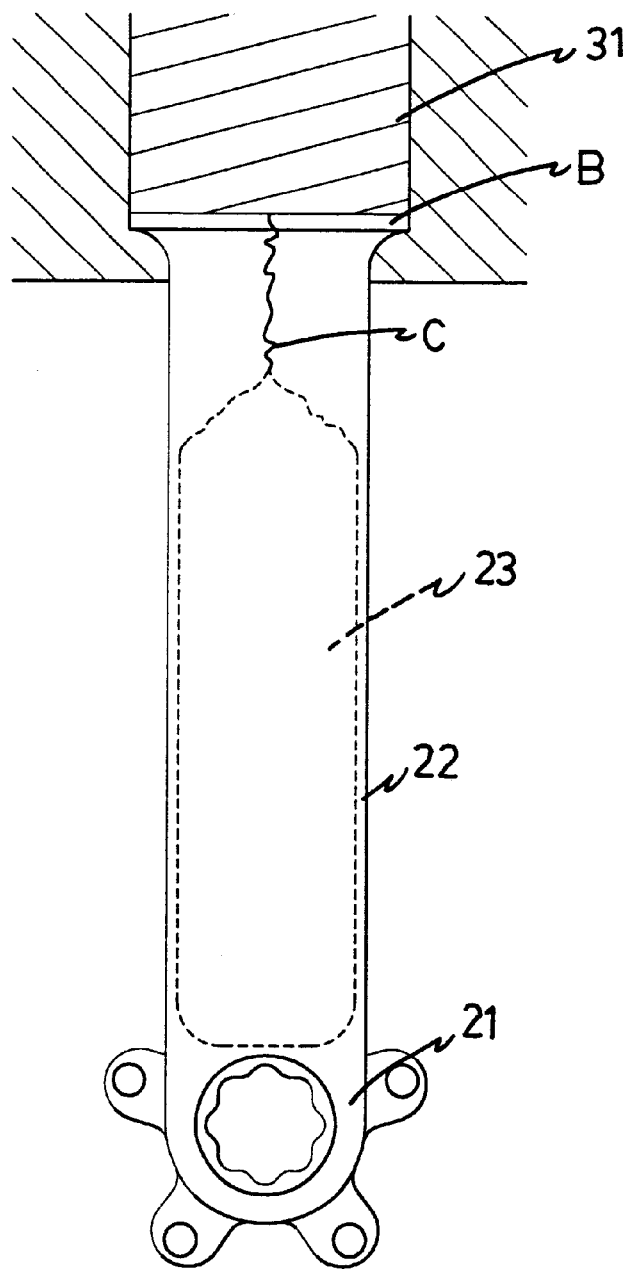
FIG. 6 is a front plan cross-sectional view showing a third step of the method as shown in FIG. 3.

Referring to FIGS. 5 and 6, in the step (c) for forging and sealing a rear end of the crank body, after the plunger 30 is removed from the hollow crank body 22, a forging mold 31 which mates the surface configuration of the rear end of the preparing material "A" is mounted on the preparing material "A" for pressing the preparing material "A" so that the material on the rear end of the preparing material "A" is distorted and bent from all sides toward the channel 23 to be embedded into the channel 23 with a residue material "B" being left on the rear end of the hollow crank body 22. The material embedded into the channel 23 alternates in an irregular manner under the great pressure exerted by the forging mold 31 to seal the rear end of the channel 23 of the hollow crank 22. During the distortion and flow of the preparing material "A", an irregular shaped weldment "C" is formed in the material embedded into the channel 23. High temperature is created when the preparing material "A" is distorted, so that the high pressure and temperature along surface "C" forms a weldment. Alternately, a small open channel may remain at "C" without effecting the function of the crank.

Figure 7:
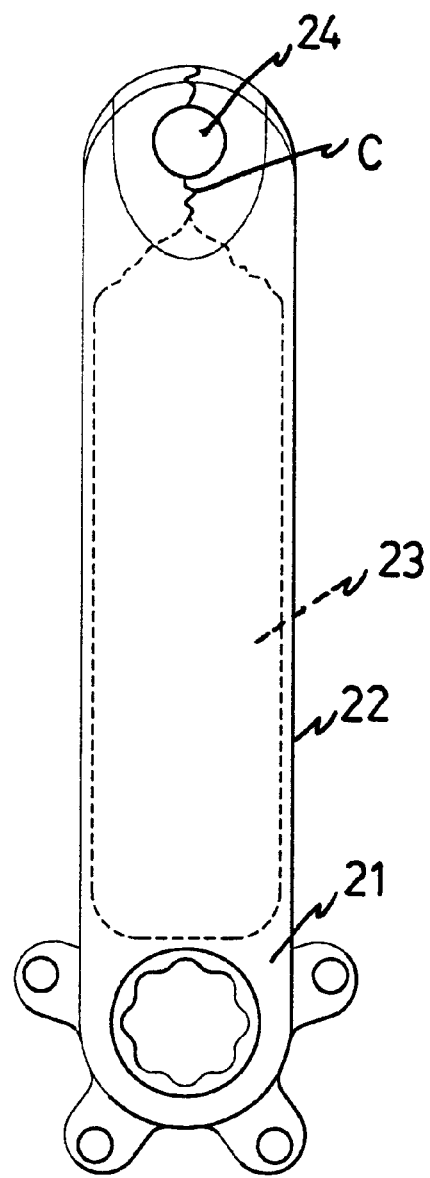
FIG. 7 is a front plan cross-sectional view showing a fourth step of the method as shown in FIG. 3.

Referring to FIGS. 6 and 7, in the step (d) for cutting and piercing the rear end of the crank body, the residue material B left on the rear end of the hollow crank body 22 is cut by a cutting machine, and a through screw hole 24 is formed at a pre-determined position in the hollow crank body 22 by a pre-fitted drilling machine so as to form a complete hollow crank.

In such a manner, according to the method of the present invention, the hollow crank can be integrally forged and molded quickly by fewer manufacturing steps than that of the conventional method. In addition, the product surface of the hollow crank is finished to have a fine and pretty appearance so that it is not easy to produce a defective product, thereby enhancing the aesthetics and quality and saving the manufacturing cost of hollow crank. Further, better aluminum alloys can be used by this method that cannot be used for casting or joined by common welding, thus a better crank can be made with a lower cost.

It should be clear to those skilled in the art that further embodiments may be made without departing from the scope of the present invention.

What is claimed is:

1. A method for integrally forming and manufacturing an one-piece forged hollow crank of a bicycle comprising the steps of:

(a) forging and molding a leading edge of a crank:

forging and molding a stock of a hollow crank of a bicycle in a die (20) by a forging machine to form a leading edge of a crank having a front end formed with a joint portion (21) and a rear end formed with a preparing material (A);

(b) extruding a crank body:

moving a plunger (30) into said preparing material (A) to press and extrude said preparing material (A) upward on said plunger (30) to form an elongated hollow crank body (22) on said plunger (30) with a channel (23) being formed in said hollow crank body (22);

(c) forging a rear end of the crank body:

after said plunger (30) is removed from said hollow crank body (22), pressing said preparing material (A) by a forging mold (31) so that a material of a rear end of said preparing material (A) is distorted and bent from all sides toward said channel (23) to be embedded into said channel (23) with a residue material (B) being left on a rear end of said hollow crank body (22), said material embedded into said channel (23) under the pressure exerted by said forging mold (31) to minimize any opening at rear end of said channel (23) of said hollow crank (22); and (d) cutting and piercing the rear end of the crank body:

cutting said residue material (B) left on said rear end of said hollow crank body (22) by a cutting machine, and piercing a through hole (24) in said hollow crank body (22) by a pre-fitted machine so as to form a hollow crank.

2. The method in accordance with claim 1, wherein in said step (b), said plunger (30) is pressed into a central portion of said preparing material (A).

3. The method in accordance with claim 1, wherein in said step (c), an irregular shaped weldment (C) is formed in said material embedded into said channel (23).

* * * * *